(12) United States Patent
Bakshi

(10) Patent No.: US 6,970,425 B1
(45) Date of Patent: Nov. 29, 2005

(54) METHOD AND APPARATUS FOR THROTTLING AND DISTRIBUTING DATA TRANSMISSIONS ACROSS A NETWORK

(75) Inventor: Yury Bakshi, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/559,519

(22) Filed: Apr. 27, 2000

(51) Int. Cl.[7] .................. H04L 12/26; G06F 15/16; G06F 9/46
(52) U.S. Cl. .................. 370/235; 718/105; 709/225; 709/232
(58) Field of Search ............... 370/230–236, 370/252, 468; 709/233, 224, 105, 219, 225; 718/105

(56) References Cited

U.S. PATENT DOCUMENTS

| | | | | |
|---|---|---|---|---|
| 5,633,859 A | * | 5/1997 | Jain et al. ............... | 370/236 |
| 5,774,668 A | * | 6/1998 | Choquier et al. ........ | 709/105 |
| 5,799,002 A | * | 8/1998 | Krishnan ................ | 370/234 |
| 5,918,017 A | * | 6/1999 | Attanasio et al. ....... | 709/239 |
| 6,006,264 A | * | 12/1999 | Colby et al. ............ | 709/226 |
| 6,259,705 B1 | * | 7/2001 | Takahashi et al. ...... | 370/230 |
| 6,263,368 B1 | * | 7/2001 | Martin ................... | 709/105 |
| 6,374,297 B1 | * | 4/2002 | Wolf et al. ............. | 709/226 |
| 6,393,458 B1 | * | 5/2002 | Gigliotti et al. ........ | 709/203 |
| 6,401,121 B1 | * | 6/2002 | Yoshida et al. ......... | 709/105 |
| 6,438,652 B1 | * | 8/2002 | Jordan et al. .......... | 711/120 |
| 6,442,139 B1 | * | 8/2002 | Hosein ................... | 370/236 |
| 6,560,717 B1 | * | 5/2003 | Scott et al. ............ | 714/4 |

FOREIGN PATENT DOCUMENTS

JP            10224356      *  8/1998      ........... H04L 12/56

* cited by examiner

Primary Examiner—Steven Nguyen

(57) ABSTRACT

The present invention provides a throttling unit for throttling and distributing data transmissions between terminals and servers in a network. The throttling unit determines a current status of the servers in the system, typically by receiving an overload notification from each server. Once the throttling unit has determined the current status of the servers, the throttling unit can adjust transmission rates of terminals to control the amount of the data received by each server based on its corresponding status. The transmission rate can also include a local load coefficient which can be adjusted to either increase or decrease the transmission rate of a terminal to a server depending on the status of the servers. A data transmission can subsequently be sent from a terminal to the servers based on the transmission rate determined for each of the servers.

14 Claims, 7 Drawing Sheets

FIG. 3A
300

| SERVER ID | CURRENT STATUS | OVERLOADED? | LOAD COEFFICIENT | TRANSMISSION RATE |
|---|---|---|---|---|
| 108 | GOOD | NO | 1 | 1/3 |
| 110 | GOOD | NO | 1 | 1/3 |
| 112 | GOOD | NO | 1 | 1/3 |
|  |  |  |  |  |
|  |  |  |  |  |

FIG. 3B
300

| SERVER ID | CURRENT STATUS | OVERLOADED? | LOAD COEFFICIENT | TRANSMISSION RATE |
|---|---|---|---|---|
| 108 | FAIR | NO | 1 | 1/9 |
| 110 | GOOD | NO | 1 | 4/9 |
| 112 | GOOD | NO | 1 | 4/9 |
|  |  |  |  |  |
|  |  |  |  |  |

FIG. 3C
300

| SERVER ID | CURRENT STATUS | OVERLOADED? | LOAD COEFFICIENT | TRANSMISSION RATE |
|---|---|---|---|---|
| 108 | POOR | YES | 1 | 0 |
| 110 | GOOD | NO | 1 | 3/4 |
| 112 | FAIR | NO | 1 | 1/4 |
|  |  |  |  |  |
|  |  |  |  |  |

FIG. 3D
300

| SERVER ID | CURRENT STATUS | OVERLOADED? | LOAD COEFFICIENT | TRANSMISSION RATE |
|---|---|---|---|---|
| 108 | FAIR | YES | 0.5 | 1/9 |
| 110 | GOOD | YES | 0.5 | 7/9 |
| 112 | FAIR | YES | 0.5 | 1/9 |
| | | | | |
| | | | | |

FIG. 3E
350

| SERVER ID | OVERLOADED? | LOAD COEFFICIENT | TRANSMISSION RATE |
|---|---|---|---|
| 108 | NO | 1 | 1/3 |
| 110 | NO | 1 | 1/3 |
| 112 | NO | 1 | 1/3 |
| | | | |
| | | | |

FIG. 3F
350

| SERVER ID | OVERLOADED? | LOAD COEFFICIENT | TRANSMISSION RATE |
|---|---|---|---|
| 108 | YES | 0.95 | 1/3 |
| 110 | YES | 0.95 | 1/3 |
| 112 | YES | 0.95 | 1/3 |
| | | | |
| | | | |

FIG. 3G
350

| SERVER ID (352) | OVERLOADED? (354) | LOAD COEFFICIENT (356) | TRANSMISSION RATE (358) |
|---|---|---|---|
| 108 | NO | 0.9 | 1/3 |
| 110 | NO | 0.9 | 1/3 |
| 112 | NO | 0.9 | 1/3 |
| | | | |
| | | | |

FIG. 3H
350

| SERVER ID (352) | OVERLOADED? (354) | LOAD COEFFICIENT (356) | TRANSMISSION RATE (358) |
|---|---|---|---|
| 108 | YES | 0.95 | 1/3 |
| 110 | YES | 0.95 | 1/3 |
| 112 | YES | 0.95 | 1/3 |
| | | | |
| | | | |

FIG. 3I
350

| SERVER ID (352) | OVERLOADED? (354) | LOAD COEFFICIENT (356) | TRANSMISSION RATE (358) |
|---|---|---|---|
| 108 | NO | 1 | 1/3 |
| 110 | NO | 1 | 1/3 |
| 112 | NO | 1 | 1/3 |
| | | | |
| | | | |

350

| SERVER ID | OVERLOADED? | LOAD COEFFICIENT | TRANSMISSION RATE |
|---|---|---|---|
| 108 | YES | 1 | 1/3(1−0.05) |
| 110 | NO | 1 | 1/3(1+0.025) |
| 112 | NO | 1 | 1/3(1+0.025) |
|  |  |  |  |
|  |  |  |  |

352, 354, 356, 358

400

METHOD AND APPARATUS FOR THROTTLING AND DISTRIBUTING DATA TRANSMISSIONS ACROSS A NETWORK

BACKGROUND OF THE INVENTION

1. Field of Invention

The present invention is directed to a method and apparatus for throttling and distributing data transmissions across a network.

2. Description of Related Art

Presently, terminals, such as service switching points, send requests to servers, such as Service Control Points. These requests represent message exchanges between the involved terminals and servers. A request begins with an initial query message being sent by the terminal to the server. After processing the initial query message, the server may send a response message back to the terminal. Depending on the circumstances, the terminal may then send a subsequent query(s) to the server requesting further processing which may in turn result in subsequent responses being sent back. The request ends when the last pair of request/optional response is processed.

Occasionally, a server may become overloaded when terminals send requests faster than the server can process the requests. As a result, the overload may cause considerable delay in servicing any subsequent requests. This problem can occur more frequently when the terminals have higher processing capabilities than the servers. The problem is also common when terminals send requests in a system having a set of heterogeneous servers (i.e., servers with different processing capabilities from each other).

SUMMARY OF THE INVENTION

The present invention provides a throttling unit for throttling and distributing data transmissions between terminals and servers in a communication system. The throttling unit determines a current status of the servers in the system by querying each of the servers at a predetermined interval. Alternatively, the servers may independently report their status to the throttling unit. The current status of the servers can further include receipt of an overload notification from a server indicating any or all of the servers are overloaded (i.e., demand for a server's resources exceeds the server's resources).

Once the throttling unit has determined the current status of the servers, the throttling unit can adjust transmission rates of terminals to control the amount of data received by each of the servers, based on the corresponding current status of each of the servers. The transmission rate can also include a local load coefficient which can be adjusted to either increase or decrease the aggregate transmission rate of a terminal to the servers, such increase or decrease can depend on the status of the servers.

A data transmission can subsequently be sent from a terminal to the servers based on the transmission rate determined for each of the servers. Sending a data transmission may further include blocking a portion of the data transmissions based on a current value of a local load coefficient.

The present invention can further improve server delay characteristics, reduce the probability of server overload, and improve aggregate server throughout.

BRIEF DESCRIPTION OF THE DRAWINGS

The preferred embodiments of the present invention will be described with reference to the following figures, wherein like numerals designate like elements, and wherein:

FIGS. 3a–3j are exemplary data structures for storing information corresponding to servers in the memory of FIG. 2;

FIG. 4 is a flowchart outlining an exemplary operation of a server according to the present invention;

DETAILED DESCRIPTION OF PREFERRED EMBODIMENTS

Figure 1:
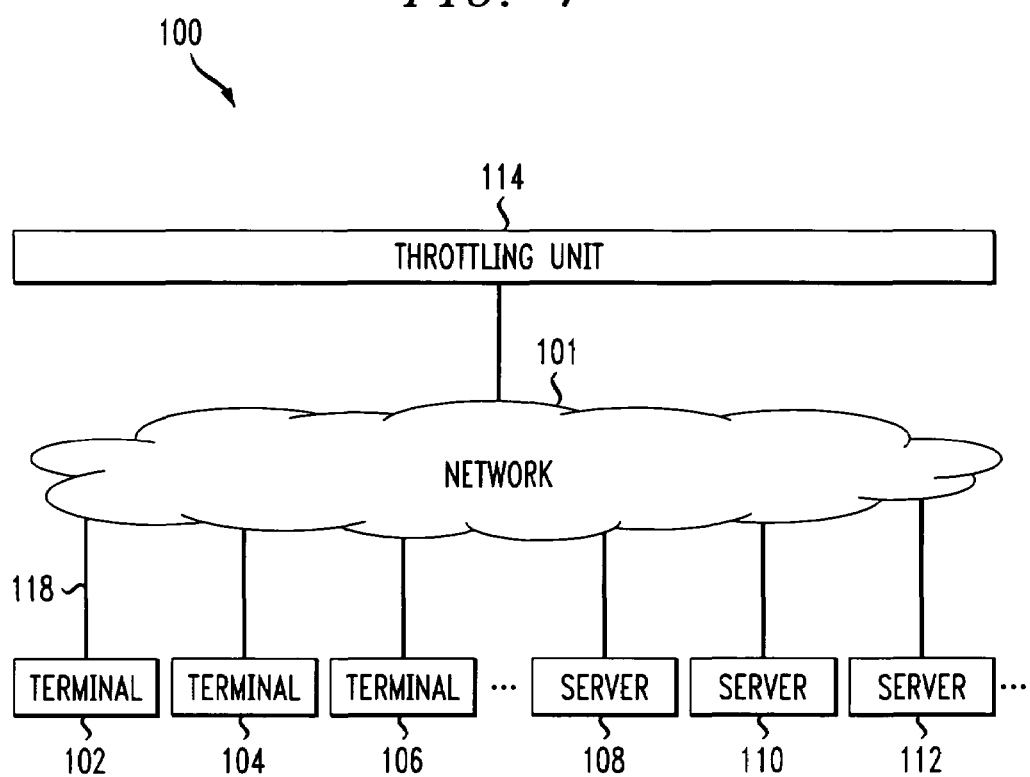
FIG. 1 is an exemplary block diagram of a system according to the present invention.

FIG. 1 is an exemplary block diagram of a throttling and distributing system 100 according to the present invention. The system 100 includes a network 101 having a plurality of terminals 102–106 and servers 108–112 in communication with the network 101 via communication links 118. The system further includes a throttling unit 114 connected with the network 101 via a communication link 118. The throttling unit 114 may perform network monitoring and control functions of the network 101. Additionally, the throttling unit 114 can monitor and control data transmissions between the terminals 102–106 and the servers 108–112.

The network 101 may be a single network or a plurality of networks of the same or different types. For example, the network 101 may include a local telephone network (such as a Bell Atlantic network) in connection with a long distance network (such as an AT&T long distance network). Furthermore, the network 101 may be a data network or a telecommunication network in connection with the data network. Any combination of telecommunication and data networks may be used without departing from the spirit and scope of the present invention. For the purposes of discussion, it will be assumed that the network 101 is a single data network.

Terminals 102–106, servers 108–112, and throttling unit 114 are in communication with network 101 over communication links 118. These communication links 118 may be any type of connection that allows for the transmission of information. Some examples include conventional telephone lines, digital transmission facilities, fiber optic lines, direct serial/parallel connections, cellular telephone connections, satellite communication links, local area networks (LANs), Intranets and the like.

Terminals 102–106 can be devices of any type that allow for the transmission and/or reception of communication signals. For example, terminals 102–106 can include CPEs, CPE modems, Digital Subscriber Line (DSL) equipment, DSL systems, cable modems, set top boxes, telephones, wireless telephones, cellular telephones, Personal Digital Assistants (PDAs), computer terminals, database terminals, pagers, facsimile machines, answering machines and the like. The servers 108–112 can be devices of any type that can receive and respond to data transmissions received from the terminals 102–106. Furthermore, each server 108–112 can have a different processing capacity.

Prior to steady-state operation of the system 100, and periodically during operation, the throttling unit 114 can determine a current status of each of the servers 108–112. The current status may be obtained by the throttling unit querying each of the servers 108–112 or having each of the servers 108–112 independently and periodically report their current status to the throttling unit 114. Regardless of the technique for acquiring the current status, the current status can represent a current capacity of the server 108–112 to process data transmissions from the terminals 102–106.

For example, if a server 108 was functioning at 100% of its operational capacity, the current status of the server 108 may be "good". However, if the server 108 was temporarily operating at only 50% of its operational capacity, possibly because of repairs being done to the server 108, then the current status of the server 108 may only be "fair". Additionally, if the server 108 were altogether removed from service, due to possible technical problems, then the current status of the server 108 may be "poor". While the current status has been described as good, fair and poor, it is to be understood that the current status may also be described as a numerical value, such as a percentage.

The current status of the servers 108–112 can include an indication as to whether any of the servers 108–112 is overloaded. An individual one of the servers 108–112 can be considered overloaded when a demand for that server's processing resources exceeds its available processing resources. An overloaded server can cause delay in responding to a data transmission from one of the terminals 102–106. Again, the throttling unit 114 may obtain a server's overload status from queries sent to the individual servers 108–112 or by the servers 108–112 periodically and independently transmitting overload status information to the throttling unit 114.

In operation, the throttling unit 114 can monitor and control the data transmissions of the terminals 102–106 which are sent to the various servers 108–112. The control of the data transmissions from the terminals 102–106 can be based on the transmission rate which the throttling unit 114 determines based on the current status of each of the servers 108–112. The transmission rate is a rate at which a terminal 102–106 is permitted to transmit data to a particular server 108–112.

For example, assume that all of the terminals 102–106 are operating properly and capable of performing at 100% of their processing capacity. Furthermore, assume that the servers 108–112 are all capable of processing data at a same rate. Accordingly, each of the three servers 108–112 would be equally capable of processing one-third of the total data transmissions received from terminals 102–106. The transmission rate for each of the servers 108–112 would then be one-third (⅓), and the throttling unit 114 could then monitor and control the data transmission of the terminals 102–106 so that approximately one-third (⅓) of the total data transmissions of each of the three terminals 102–106 is distributively transmitted to each of the servers 108–112. Alternatively, the throttling unit 114 can transmit the transmission rate corresponding to each of the servers 108–112 to the terminals 102–106 and the terminals 102–106 can then control their own data transmissions so that one-third (⅓) of their total data transmissions is transmitted to each of the servers 108–112. In this manner, a single server 108 does not become overworked while the other servers 110–112 remain idle.

While the throttling unit 114 is shown as an independent unit coupled to the network 101, it can also be incorporated into the terminals 102–106, servers 108–112 and/or may be distributed throughout the network 101. For example, the throttling unit 114 may be made part of the various central offices or servers (not shown) employed by the network 101 which are distributed throughout the network 101. Any configuration that permits monitoring and control of the network 101 can be used without departing from the spirit and scope of the present invention.

Figure 2:
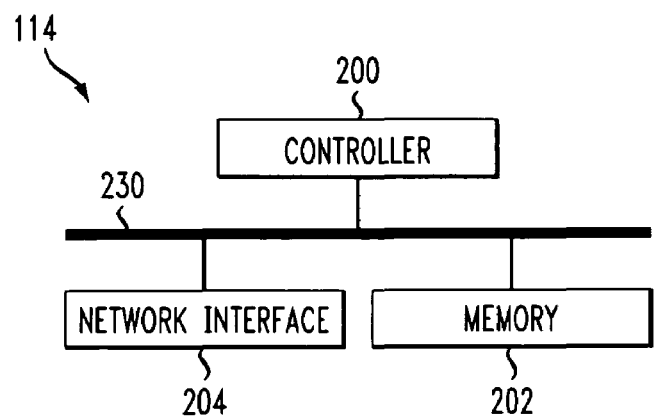
FIG. 2 is an exemplary block diagram of a throttling unit of FIG. 1.

FIG. 2 is an exemplary block diagram of the throttling unit 114. The throttling unit 114 may include a controller 200, a memory 202 and a network interface 204. The above components are coupled together through a control/signal bus 230. The controller 200 controls the operation of the throttling unit 114 and communicates with the network 101 through the network interface 204.

As described above, periodically the controller 200 gathers the current status of each of the servers 108–112 via the network interface 204. The current status of each of the servers can then be stored in the memory 202. Based on the stored current status, the controller 200 can then control the data transmission of the terminals 102–106 to respective servers 108–112.

FIGS. 3a–3d are exemplary data structures 300 of the memory 202. The data structure 300 includes a server ID field 302 which contains a unique identifier of each of the servers 108–112. As shown, the server IDs in field 302 can correspond to the numbering of the servers numbering 108–112 in FIG. 1.

Field 304 contains the current status corresponding to each of the servers in field 302. The current status of a server corresponds to a current ability of the server to process data. For the purposes of this discussion, it will be assumed that the current status of a server may be one of good, fair, or poor. As shown in FIG. 3a, the current status of all of the terminals is "good". As described above, the current status of a server may also be described numerically, such as by a percentage.

Field 306 contains information related to an overload status of a server 108–112. As described above, a server is overloaded when the amount of processing required to process incoming data transmissions exceeds the processing capacity of the server 108–112.

Field 308 contains a load coefficient Q corresponding to each of the servers. The load coefficients of each of the servers may be the probability of the terminals 102–106 distributing a data transmission to one of the servers 108–112 rather than blocking the data transmission. Because the load coefficient Q represents a probability, acceptable values for the load coefficient ranges from 0 to 1. Each terminal 102–106 can block a data transmission according to the value of Q by blocking (1−Q)*L number of data transmissions out of a total L number of data transmissions.

Field 310 contains a transmission rate corresponding to each of the servers. As described above, the transmission rate can define a portion of the total data transmissions that is to be received by each of the servers 108–112. Alternatively, the transmission rate can be a portion of a particular terminal's 102–106 data transmissions which are sent to a particular server 108–112.

Examples of operation of the throttling unit 114 will now be described with reference to the data structures 300 shown in FIGS. 3a–3d. Referring first to the FIG. 3a, all of the servers 108–112 are shown to have a "good" current status and none of the servers are overloaded. Accordingly, the controller 200 has set the load coefficient of each of the servers 108–112 to be one (1) and the transmission rate of each of the servers 108–112 is set to be one-third (⅓). As described above, this means that one-third (⅓) of all the data transmissions of the terminals 102–106 is transmitted to each of the servers 108–112.

Referring to FIG. 3b, field 304 shows that the server having server ID 108 has a "fair" current status, while the servers having server IDs 110 and 112 both have a "good" current status. Field 306 shows that none of the servers are currently overloaded. Accordingly, the load coefficient for each of the servers is equal to one.

Assume for this example that the server having server ID 108 has a current status that is equal to "fair" because the server is temporarily being repaired. Accordingly, the server is not operating at full capacity. For instance, the server 108 may only be operating at 50% of full capacity. Accordingly, the controller 200 may calculate the transmission rates as shown in field 310 to take into account the current status of each of the servers 108–112.

For example, the transmission rate corresponding to the server having server ID 108 is one-ninth (⅑) while the transmission rates of the servers having server IDs 110 and 112 is four-ninths (⁴⁄₉). The difference in transmission rates between server 108 and servers 110–112 reflects the differing current status of each of the servers. For example, only one-ninth (⅑) of the data transmission being sent from terminals 102–106 are now sent to server ID 108 while eight-ninths (⁸⁄₉) of the transmission are divided equally between servers 110 and 112.

Referring now to FIG. 3c, the server having server ID 108 has been determined by the controller 200 to have a current status of "poor". The current status of server 110 is "good", while the current status of server 112 is "fair". Furthermore, as can be seen from field 306, the server having server ID 108 is currently overloaded, while the servers 110 and 112 are not.

Based on the current status and overloaded status of each of the servers 108–112, the controller has generated a set of transmission rates which are shown in field 310. The transmission rate for the overloaded server, server 108, is zero. This means that none of the terminals 102–106 are currently sending data transmissions to the server 108. In contrast, the servers 110 and 112 now have an increased transmission rate. Furthermore, the server 110 which has a current status of "good" must now take on more of the transmission from the terminals 102–106 than the server having ID 112 and a current status of "fair". Accordingly, the transmission rate of server 110 is three-fourths (¾) while the transmission rate of server 112 is only one-fourth (¼).

Referring now to FIG. 3d, the current status of server 108 and server 112 is "fair", while the current status of server 110 is "good". However, in FIG. 3d, the field 306 indicates that all of the servers 108–112 are overloaded.

In response, the controller 200 may decide to limit the output of each of the terminals 102–106 by reducing the load coefficient of a terminal transmitting to each of the servers 108–112. As shown in field 308, the load coefficient corresponding to each of the servers 108–112 is now set to 0.5. Because of this, when a terminal 102–106 attempts to transmit to any of the servers 108–112, the server will be restricted to transmitting only one-half of the total data transmissions which it may wish to transmit. The load coefficient of 0.5 may indicate that half of the data transmissions are transmitted to the servers 108–112 while half of the data transmissions are discarded by the terminals 102–108.

Furthermore, field 310 of FIG. 3d indicates that the transmission rate of the server 108 and server 112 is set to one-ninth while the transmission rate of the server 110 is set to seven-ninths. As described above, the transmission rates are set to reflect the current status of each of the terminals 102–106 as indicated in field 304. Accordingly, one-ninth of the total transmissions from the terminals 102–106 are being sent to the server 108, while at the same time, one-half of the transmissions from the terminals 102–106 which are sent to the servers 108–112 are actually being transmitted. Accordingly, the loads on all of the servers are reduced in proportion to their current status. The overload status, as shown in field 306, can be removed once the servers 108–112 are no longer overloaded.

FIGS. 3e–3j are alternative exemplary data structures 350 of the memory 202. The data structure 350 includes a server ID field 352 that is similar to the server ID field 302 of the data structure 300. The data structure 350 also includes an overloaded field 354, a load coefficient field 356, and a transmission rate field 358 which are similar to the overloaded field 306, the load coefficient field 308, and the transmission rate field 310, respectively, of data structure 300.

Figures 3J, 4:
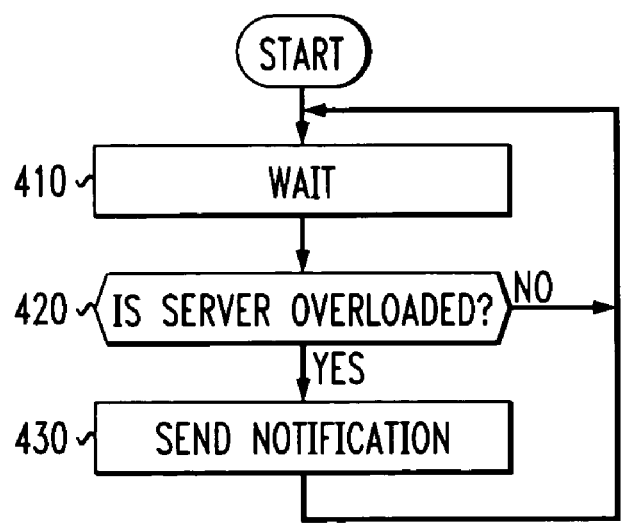

An alternative example of operation of the throttling unit 114 will now be described with reference to data structure 350 shown in FIGS. 3e–3j. Referring first to FIG. 3e, none of the servers are shown to be overloaded. Accordingly, the controller 200 has set the load coefficient of each of the servers 108–112 to be one (1), and the transmission rate for each of the servers 108–112 is set to be one third (⅓). As described above, this means that one third (⅓) of the data transmission of the terminals 102–106 is transmitted to each of the servers 108–112.

Referring to FIG. 3f, when a total load from the terminals 102–106 increases and causes the servers 108–112 to become overloaded as shown in field 354, the controller 200 may reduce the load coefficient corresponding to each of the servers 108–112 by a predetermined percentage, here the percentage is reduced by 5 percent. Therefore, as shown in field 356, the load coefficients corresponding to each of the servers 108–112 is now set to 0.95. The transmission rates for each of the servers 108–112 remains unchanged.

As shown in FIG. 3f, the servers 108–112 still remain overloaded even after a reduction of in the load coefficient of 5 percent. Accordingly, the controller 200 again reduces the load coefficient by 5 percent. The new value of the load coefficient as shown in field 356 of FIG. 3g is now 0.9. Again, the transmission rates for each of the servers 108–112 remains unchanged. In response to the reduction, the overloaded status in field 354 of each of the servers 108–112 now shows that none of the servers are overloaded.

Accordingly, as shown in FIG. 3h, the load coefficient for each of the servers 108–112 may be increased by 5 percent. As shown in field 356, the load coefficient for each of the servers 108–112 is now 0.95. Again, the transmission rate in field 358 for each of the servers 108–112 remains unchanged at one third (⅓).

It is important to note that the load coefficient in column 356 may continue to oscillate between point 0.9 and 0.95 depending on the total load from the terminals 102–106. Alternatively, the load coefficient may return to one (1) when the load from the terminals 102–106 decreases to a point where the servers 108–112 can collectively handle the total load.

An alternative example of the throttling unit 114 will now be described with reference to data structure 350 shown in FIGS. 3i and 3j. Referring first to FIG. 3i, assume that servers 110 and 112 are running at full capacity, while the server corresponding to server ID 108 is experiencing a partial failure. In the initial state, the servers 108–112 are all exhibiting a non-overload condition, having a load coefficient of one (1) and a transmission rate of one third (⅓).

Referring now to FIG. 3j, as the controller 200 becomes aware that the server 108 is experiencing a partial failure and is now overloaded, the controller 200 will reduce the transmission rate of data sent to the terminal 108 by a predetermined amount; in this example, the predetermined amount is 5 percent. Accordingly, the transmission rate corresponding to server 108 in field 358 is reduced by 5 percent while the transmission rate of the terminals 110, 112 are each increased by one half of 5 percent (2.5 percent) in order to make up for the servers 108's decreased capacity. As described above in the above example, the process may continue until the server 108 is no longer overloaded.

FIG. 4 is a flowchart outlining an exemplary operation of a throttling unit to determine whether a server is overloaded. Initiation of the process begins in step 400. In step 410, the server waits for a predetermined period of time, such as 10 seconds. In step 420, the server determines if it is overloaded. If the server is not overloaded, or is normally loaded, the process returns to step 410. If the server is overloaded, the server advances to step 430 where the server sends an overload notification to the throttling unit. After the server sends the overload notification, the server returns to step 410.

Figure 5:
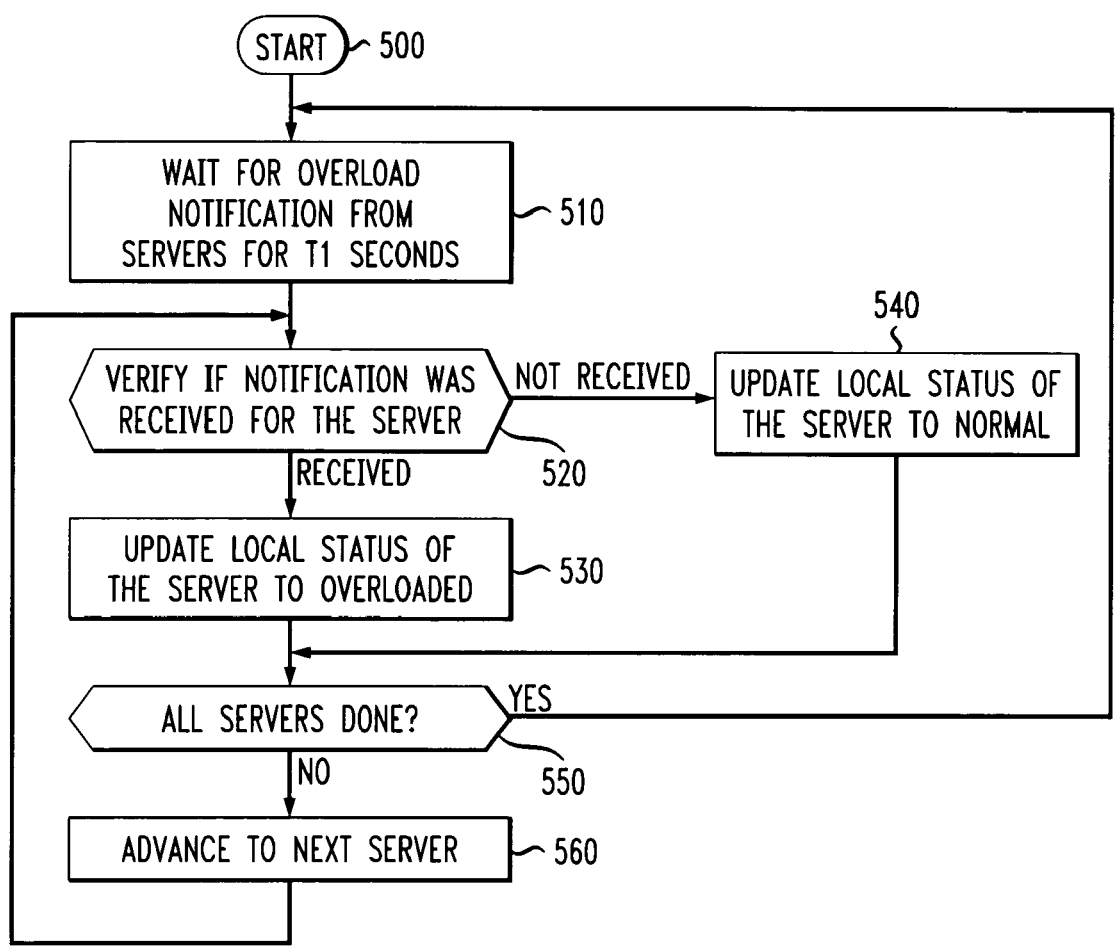
FIG. 5 is a flowchart outlining an exemplary operation of a client according to the present invention.

FIG. 5 is a flowchart outlining an exemplary operation of a terminal to determine whether a server is overloaded. Initiation of the process begins in step 500 and proceeds to step 510. In step 510, the terminal waits for an overload notification from a server for T seconds. This period of time may be set to, for example, 15 seconds. In step 520, the terminal verifies if notification for a particular server was received. If notification was received, the terminal advances to step 530; otherwise, if notification was not received, the terminal advances to step 540.

In step 530, the terminal updates an overload status of the particular server to "overloaded." In step 540, the terminal updates an overload status of the server to "normal." For example, the terminal may maintain an overload status of a server if the client receives an overload notification. Additionally, the terminal maintains a normally loaded status of the server if the terminal has not received an overload notification for a period of time such as, for example, T seconds. In this manner, the terminal can maintain a status of all of the servers.

In step 550, the terminal determines if all of the servers are done reporting. If all of the servers are done, the terminal advances to step 510. If all of the servers are not done reporting, the terminal advances to step 560. In step 560, the terminal advances to a next server and then returns to step 520.

As described above, the throttling unit 114 can also maintain a local load coefficient Q. The load coefficient Q is the probability of the terminals 102–106 distributing a data transmission to one of the servers 108–112 rather than blocking the data transmission. Because the load coefficient Q represents a probability, acceptable values for the load coefficient range from zero to one. Each terminal 102–106 can block data transmissions according to a value of Q by blocking, for example, (1−Q)*L number of data transmissions out of L transmissions where L represents a number of data transmissions.

As also described above, the terminals 102–108 may additionally maintain a number of transmission rates w(j), where w(j) is the weight of the j-th server. Transmission rates w(j) is the probability of a client distributing a non-blocked data transmission to a j-th server. Each terminal 102–106 may distribute new non-blocked data transmission among the servers 108–112 according to transmission rate values by distributing to a j-th server, for example, w(j)*L1 number of data transmissions out of a total of L1 non-blocked data transmissions. The sum of all w(j) transmission rates will be equal to 1. During a second period of time, for example R seconds (R≧T), each terminal 102–106 can update its local load coefficients and all weights. It may not be required that different terminals 102–106 perform the upgrades simultaneously. The upgrade rules can be performed according to the following flowcharts.

Figure 6:
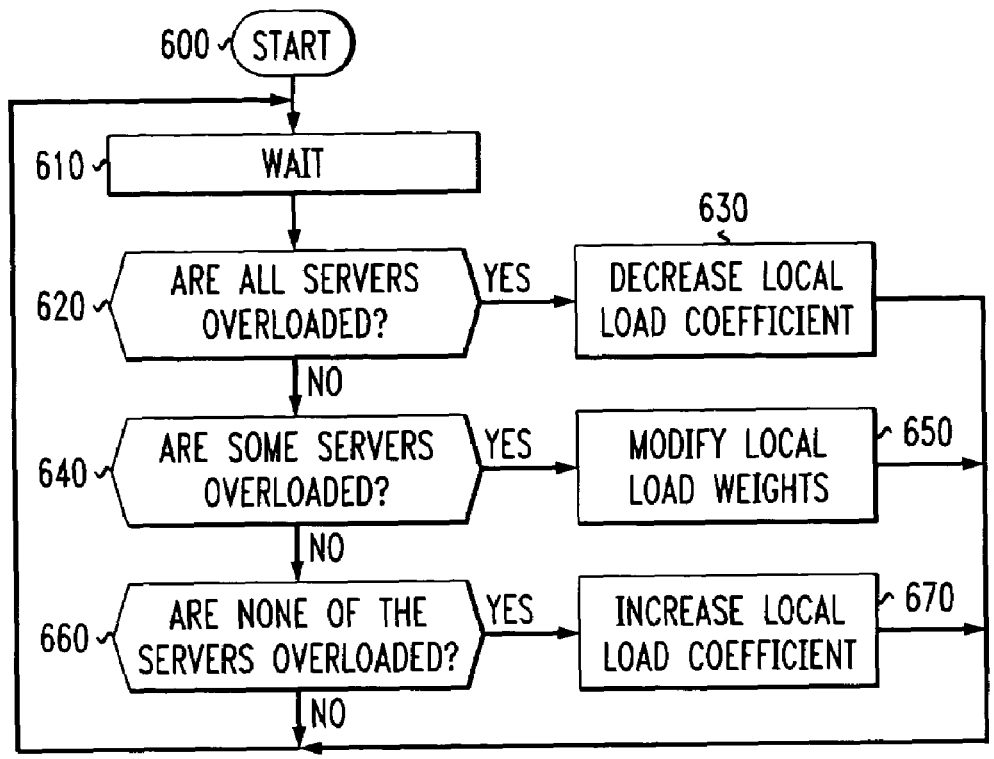
FIG. 6 is a flowchart outlining an exemplary operation of a terminal according to the present invention.

FIG. 6 is a flowchart outlining another exemplary operation of a terminal or throttling unit. This flowchart illustrates the periodic updating of the local load coefficients Q and the transmission rates w(j) by a server. Initiation of the process begins in step 600 and proceeds to step 610.

In step 610, the terminal waits for a period of time R. The period may be set to, for example, 15 seconds. In step 620, the terminal determines if all of the servers are overloaded. The overloaded determination can be based on a local load status of the servers. If all of the servers are not overloaded, the terminal advances to step 640. If all of the servers are overloaded, the terminal advances to step 630.

In step 630, the terminal decreases a local load coefficient. This decrease in the local load coefficient may increase the probability of the terminal blocking data transmission. For example, the local load coefficient Q may be decreased by a value of 0.05. The process then advances to step 610.

Alternatively, in step 640, the terminal may determine if some of the servers are overloaded. This determination can be based on a local load status of the servers. If none of the servers are overloaded, the process advances to step 660; otherwise, if some of the servers are overloaded, the process advances to step 650. In step 650, the terminal can modify the local transmission rate w(j) of the servers. The terminal can modify the local transmission rate w(j) to move some of the load from the overloaded servers to the normally loaded servers. For example, the terminal can decrease the transmission rate w(j) of the overloaded servers by some percentage, for example, 5%. The terminal may additionally increase the transmission rate w(j) of the normally loaded servers by the different percentage, for example, P %, so that the sum of the weights for all the servers after the update still stays equal to one. P may be calculated as 0.05 multiplied by sum of all weights for normally loaded servers estimated prior to weight increase and, then divided by the sum of all weights for overloaded servers estimated prior to their decrease. The process then advances to step 610.

In step 660, the terminal determines whether any of the servers is overloaded. This determination may be based on the local load status of the servers. If at least one of the servers is overloaded, the process returns to step 610. If none of the servers are overloaded, the process advances to step 670. In step 670, the terminal increases the local load coefficient Q. Increasing the local load coefficient increases the total server load without redistributing the load. This increase can result in a decrease in the probability of the terminals blocking or discarding requests. For example, the terminal may increase the local load coefficient Q by some value, for example, 0.05. The local load coefficient may be increased up to a value of one. The process then returns to step 610.

Figure 7:
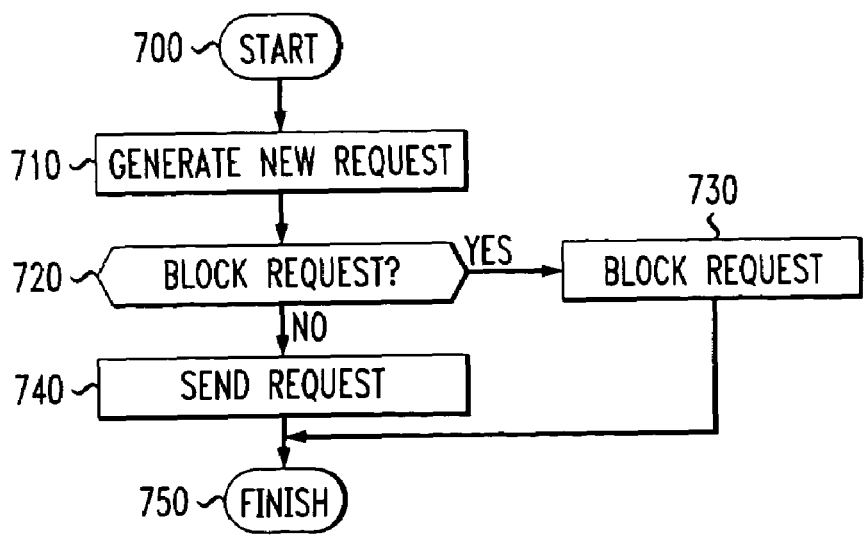
FIG. 7 is a flowchart outlining another exemplary operation of a terminal according to the present invention.

FIG. 7 is a flowchart outlining another exemplary method for throttling data transmission. This flowchart illustrates the generating and distributing of new data transmissions by the terminals. Initiation of the process begins in step 700 and proceeds to step 710. In step 710, the terminal generates a new data transmission.

In step 720, the terminal determines whether to block the transmission. The transmission can be blocked based on a current value of the local load coefficient Q. For example, the determination of blocking the data transmission may be determined according to a probability blocking the transmission of (1–Q). If the client determines not to block the data transmission, the process advances to step 740. The terminal may send the data transmission to one of the servers 108–112 based on the current values of the local transmission rates w(j). For example, the transmission may be sent to the server j with probability w(j). If the terminal determines to block the data transmission, the process advances to step 730. In step 730, the terminal blocks the data transmission and advances to step 750 where the process ends.

The method of this invention is preferably implemented on a programmed processor. However, throttling unit 114 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in FIGS. 4–7 may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of controlling data transmissions in a network between at least one terminal and a plurality of servers, comprising:

determining a current status of said plurality of servers; and adjusting the transmissions from the at least one terminal to said plurality of servers based on the status of said plurality of servers by modifying at least one local transmission weight at said at least one terminal to move a load from at least one overloaded server to at least one non-overloaded server, wherein said local transmission weight represents a probability of said at least one terminal distributing a data transmission to a particular server.

2. The method of claim 1, wherein the step of determining a current status of said plurality of servers comprises receiving an overload notification from at least one server and updating a local status indicator for the at least one server.

3. The method of claim 1, wherein the step of determining a current status of said plurality of servers comprises determining an overload status of each server based on whether any server is overloaded.

4. The method of claim 1, wherein the step of adjusting the transmission further comprises adjusting a local load coefficient at said at least one terminal, wherein said local load coefficient represents a probability of said at least one terminal distributing a data transmission to a server rather than blocking the data transmission.

5. The method of claim 4, wherein the step of adjusting the local load coefficient includes decreasing the local load coefficient if all of the servers are overloaded.

6. The method of claim 4, wherein the step of adjusting the local load coefficient comprises increasing the local load coefficient if none of the servers are overloaded.

7. The method of claim 1, wherein the step of adjusting the transmission further comprises modifying at least one local transmission weight if a portion of said plurality of servers is overloaded.

8. An apparatus that controls data transmissions on a network between at least one terminal and a plurality of servers, comprising:

a memory;

a network interface; and a controller, connected to the memory and the interface said controller:

1) determining a current status of said plurality of servers, and 2) adjusting the transmissions from the at least one terminal to said plurality of servers based on the status of said plurality of servers by modifying at least one local transmission weight at said at least one terminal to move a load from at least one overloaded server to at least one non-overloaded server, wherein said local transmission weight represents a probability of said at least one terminal distributing a data transmission to a particular server.

9. The apparatus of claim 8, wherein the controller determines a current status of said plurality of servers by receiving an overload notification from at least one server and updating a local status of the at least one server.

10. The apparatus of claim 8, wherein the controller determines a current status of said plurality of servers by determining an overload status of each server based on whether any or all of the servers are overloaded.

11. The apparatus of claim 8, wherein the controller further adjusts the transmission by adjusting a local load coefficient at said at least one terminal, wherein said local load coefficient represents a probability of said at least one terminal distributing a data transmission to a server rather than blocking the data transmission.

12. The apparatus of claim 11, wherein the controller adjusts the local load coefficient by decreasing the local load coefficient if all of the servers are overloaded.

13. The apparatus of claim 12, wherein the controller adjusts the local load coefficient by increasing the local load coefficient if none of the servers are overloaded.

14. The apparatus of claim 8, wherein the controller adjusts the transmission by modifying at least one local transmission weight if a portion of said plurality of servers is overloaded.

* * * * *